(12) United States Patent
Smith, III

(10) Patent No.: US 7,810,785 B2
(45) Date of Patent: Oct. 12, 2010

(54) UNDERSEA HYDRAULIC COUPLING WITH HYDROSTATIC PRESSURE ENERGIZED METAL SEAL

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 725 days.

(21) Appl. No.: 11/741,481

(22) Filed: Apr. 27, 2007

(65) Prior Publication Data

US 2008/0264503 A1 Oct. 30, 2008

(51) Int. Cl.
*F16L 29/04* (2006.01)

(52) U.S. Cl. ............... 251/149.7; 137/614.04; 285/110; 285/917

(58) Field of Classification Search ........ 137/614, 137/614.04, 614.03, 614.05; 251/149.1, 251/149.6, 149.7; 285/108, 111, 917, 110
See application file for complete search history.

(56) References Cited

U.S. PATENT DOCUMENTS

| | | | |
|---|---|---|---|
| 4,694,859 A | 9/1987 | Smith, III | |
| 4,817,668 A | 4/1989 | Smith, III | |
| 4,884,584 A | 12/1989 | Smith, III | |
| 5,029,613 A | 7/1991 | Smith, III | |
| 5,099,882 A | 3/1992 | Smith, III | |
| 5,158,305 A | 10/1992 | Halling | |
| 5,203,374 A | 4/1993 | Smith, III | |
| 5,232,021 A * | 8/1993 | Smith | 137/614.04 |
| 5,284,183 A | 2/1994 | Smith, III | |
| 5,339,861 A | 8/1994 | Smith, III | |
| 5,355,909 A | 10/1994 | Smith, III | |
| 5,810,048 A * | 9/1998 | Zeiner-Gundersen | 137/614.04 |
| 5,979,499 A | 11/1999 | Smith, III | |
| 6,007,106 A | 12/1999 | Wilkins | |
| 6,179,002 B1 | 1/2001 | Smith, III | |
| 6,575,430 B1 | 6/2003 | Smith, III | |
| 6,923,476 B2 | 8/2005 | Smith, III | |
| 6,962,347 B2 | 11/2005 | Smith, III | |
| 6,983,940 B2 | 1/2006 | Halling | |
| 7,021,677 B2 | 4/2006 | Smith, III | |
| 7,163,190 B2 | 1/2007 | Smith, III | |
| 7,201,381 B2 | 4/2007 | Halling | |

(Continued)

FOREIGN PATENT DOCUMENTS

GB 2 183 310 A 6/1987

(Continued)

OTHER PUBLICATIONS

"Patents Act 1977: Combined Search and Examination Report under Sections 17 and 18(3)" Received in corresponding application No. GB0804194.9 dated Jun. 20, 2008.

(Continued)

*Primary Examiner*—Kevin L Lee
(74) *Attorney, Agent, or Firm*—Wong, Cabello, Lutsch, Rutherford & Brucculeri, L.L.P.

(57) ABSTRACT

A female undersea hydraulic coupling member is equipped with a pressure-energized seal configured to seal between the body of the female member and the probe of a corresponding male hydraulic coupling member in response to ambient hydrostatic pressure. In one particular preferred embodiment, the pressure-energized seal is a metal J seal retained within a removable seal cartridge.

18 Claims, 2 Drawing Sheets

U.S. PATENT DOCUMENTS

2005/0029749 A1    2/2005    Smith, III

FOREIGN PATENT DOCUMENTS

| GB | 2 208 693 A | 12/1989 |
|---|---|---|
| GB | 2 263 145 A | 7/1993 |
| GB | 2 269 216 A | 2/1994 |
| GB | 2 272 032 A | 4/1994 |
| GB | 2 274 496 A | 7/1994 |
| GB | 2 299 390 A | 2/1996 |
| GB | 2 293 424 A | 3/1996 |
| GB | 2 329 945 A | 7/1999 |
| GB | 2 378 994 A | 2/2003 |
| GB | 2 379 254 A | 5/2003 |

OTHER PUBLICATIONS

"Patents Act 1977: Combined Search and Examination Report Under Sections 17 and 18(3);" Received in corresponding application No. GB 0805760.6 dated Jun. 11, 2008.

* cited by examiner

UNDERSEA HYDRAULIC COUPLING WITH HYDROSTATIC PRESSURE ENERGIZED METAL SEAL

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

This invention relates to hydraulic coupling member. More particularly, it relates to undersea hydraulic couplings having pressure-energized metal seals.

2. Description of the Related Art

A wide variety of undersea hydraulic couplings are available. Some couplings employ metal seals. Examples of undersea hydraulic couplings having metal seals include: U.S. Pat. No. 4,694,859 for "Undersea hydraulic coupling and metal seal;" U.S. Pat. No. 4,817,668 for "Integral metal seal for hydraulic coupling;" U.S. Pat. No. 4,884,584 for "Internally preloaded metal-to-metal seal hydraulic connector;" U.S. Pat. No. 5,029,613 for "Hydraulic coupler with radial metal seal;" U.S. Pat. Nos. 5,099,882 and 5,203,374 for "Pressure balanced hydraulic coupling with metal seals;" U.S. Pat. No. 5,284,183 for "Hydraulic coupler with radial metal seal;" U.S. Pat. No. 5,339,861 for "Hydraulic coupling with hollow metal o-ring seal;" U.S. Pat. No. 5,355,909 for "Undersea hydraulic coupling with metal seals;" U.S. Pat. No. 5,979,499 for "Undersea hydraulic coupling with hollow metal seal;" U.S. Pat. No. 6,962,347 for "Metal backup seal for undersea hydraulic coupling;" and, U.S. Pat. No. 7,021,677 for "Seal retainer with metal seal members for undersea hydraulic coupling;" all to Robert E. Smith III and assigned to National Coupling Company of Stafford, Tex.

Other undersea hydraulic couplings employ only "soft seals"—i.e., non-metal seals that are typically formed of an elastomeric polymer ("elastomer") or an engineering plastic capable of being machined such as polyetheretherketone ("PEEK") or DELRIN® acetal resin.

U.S. Pat. No. 6,179,002 discloses an undersea hydraulic coupling having a radial pressure-energized seal with a dovetail interfit with the coupling body. The seal has a pair of flexible sealing surfaces for sealing with the male and female coupling members and a cavity therebetween that is exposed to fluid pressure in the coupling. The outer circumference of the seal has a dovetail interfit between inclined shoulders in the female member bore and on a seal retainer that holds the seal in the bore.

U.S. Pat. No. 6,575,430 discloses an undersea hydraulic coupling member having a ring-shaped seal with multiple sealing surfaces extending radially inwardly therefrom. The multiple sealing surfaces help guide the probe of the male coupling member into the female member without the risk of drag or galling of the receiving chamber. The seal has an interfit with reverse inclined shoulders in the female member to restrain the seal from moving radially inwardly due to vacuum or low pressure. Attention is invited in particular to the embodiments shown in FIGS. 8 and 9 of this patent.

U.S. Pat. No. 6,923,476 discloses a floating seal for an undersea hydraulic coupling member that is moveable radially to seal with the male coupling member even if there is some misalignment with the female coupling member. The floating seal is restricted from axial movement within the female coupling member receiving chamber. The floating seal may seal with the female coupling member.

U.S. Patent Application Publication No. US 2005/0029749 discloses an undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned. In certain embodiments, the bore liner is fabricated from PEEK.

U.S. Pat. No. 7,163,190 discloses an undersea hydraulic coupling member having a seal retainer with a first inner ring and a second outer ring. The first inner ring and second outer ring are concentric, at least part of the first inner ring inserted through the second outer ring. The second outer ring is threaded to the coupling member to provide sufficient torque to reduce or eliminate any gap between the seal retainer and the shoulder surface in the coupling member on which an elastomeric seal is positioned. Another elastomeric seal is held between the first inner ring and second outer ring of the seal retainer.

U.S. Pat. Nos. 6,983,940 and 7,201,381 to Halling are directed to a resilient, annular, metallic seal member having a generally J-shaped cross-section. The annular, metallic seal member includes a first end portion having a first distal end, a generally curled second end portion that extends to a second distal end, and a central body portion between and contiguous with the first and second end portions. The annular, metallic seal member has a first side and an opposite second side. The second end portion curls in a first direction in accordance with a predetermined radius such that the second distal end is located across from the first side of the annular, metallic seal member and the first and second distal ends do not face each other.

BRIEF SUMMARY OF THE INVENTION

A female undersea hydraulic coupling member is equipped with a pressure-energized seal configured to seal between the body of the female member and the probe of a corresponding male hydraulic coupling member inserted in the receiving chamber of the female member. The sealing effectiveness of the seal increases in response to ambient hydrostatic pressure.

In one particular preferred embodiment, the seal that is energized by hydrostatic pressure is contained within a removable seal cartridge which is in threaded engagement with the receiving chamber of the female coupling member.

BRIEF DESCRIPTION OF THE SEVERAL VIEWS OF THE DRAWING(S)

DETAILED DESCRIPTION OF THE INVENTION

Figure 1:
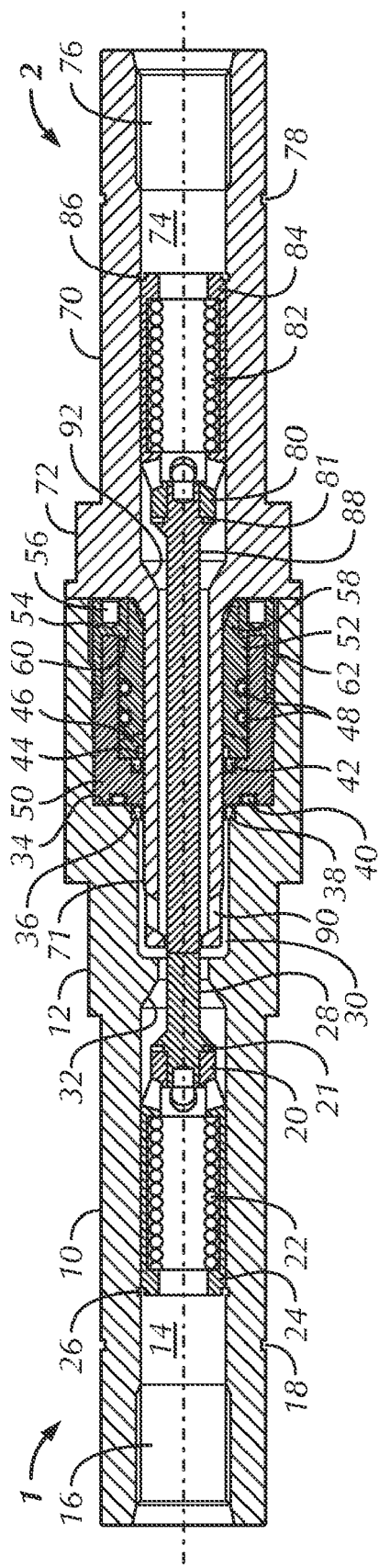
FIG. 1 is a cross-sectional view of a female hydraulic coupling member according to one embodiment of the invention engaged with a corresponding male hydraulic coupling member.

The invention may best be understood by reference to a particular embodiment of the invention. FIG. 1 shows an illustrative example of a female hydraulic coupling member 1 according to one embodiment of the invention engaged with a corresponding male hydraulic coupling member 2.

Female hydraulic coupling member 1 comprises generally cylindrical body 10 which may have one or more wrench flats 12 (one shown for purposes of illustration) on its external surface for engaging a tool (not shown) for rotating body 10 about its longitudinal axis.

Body 10 has a central, axial bore 14 which may have a varying internal diameter. One end of the central axial bore 14 may comprise internally-threaded connector 16 for attaching the female coupling to a hydraulic line, conduit, pipe nipple or the like. Various means well known in the art (such as external circumferential groove 18) may be provided for mounting the female coupling member in a manifold plate or the like.

The female coupling member may also comprise an optional poppet valve 20 within central bore 14 for retaining hydraulic fluid and preventing the entry of seawater when the coupling member is decoupled. Poppet spring 22 bearing against poppet spring seat 24 may urge poppet seal 21 against frusto-conical poppet valve seat 32 to effect closure of the poppet valve. Spring seat 24 may be retained in axial bore 14 by keeper 26 which may engage a groove in the wall of axial bore 14. Poppet valve 20 may comprise poppet actuator 28 which causes the valve to move to the open position when the coupling is mated and actuator 28 is moved axially against the resistance of compression spring 22 by contacting a corresponding poppet actuator (88) in the male member.

Also shown in FIG. 1 is corresponding male hydraulic coupling member 2 which comprises generally cylindrical body 70 which may have one or more wrench flats 72 (one shown for purposes of illustration) on its external surface for engaging a tool (not shown) for rotating body 70 about its longitudinal axis.

Body 70 has a central, axial bore 74 which may have a varying internal diameter. One end of the central axial bore 74 may comprise internally-threaded connector 76 for attaching the female coupling to a hydraulic line, conduit, pipe nipple or the like. Various means well known in the art (such as external circumferential groove 78) may be provided for mounting the female coupling member in a manifold plate or the like.

Female coupling member 1 may also comprise an optional poppet valve 80 within central bore 74 for retaining hydraulic fluid and preventing the entry of seawater when the coupling member is decoupled. Poppet spring 82 bearing against poppet spring seat 84 may urge poppet seal 81 against frusto-conical poppet valve seat 92 to effect closure of the poppet valve. Spring seat 84 may be retained in axial bore 74 by keeper 86 which may engage a groove in the wall of axial bore 74. Poppet valve 80 may comprise poppet actuator 88 which causes the valve to move to the open position when the coupling is mated and actuator 88 is moved axially against the resistance of compression spring 82 by contacting a corresponding poppet actuator (28) in the female member.

The end of male body 70 opposite connector 76 comprises male probe 71 of reduced external diameter for insertion into the receiving chamber of the female member. In the embodiment shown in FIG. 1, probe 71 is provided with anti-fouling flow ports 90 in its side wall. It is common for undersea male hydraulic coupling members to be mounted in a vertical orientation and it has been found that if radial flow ports are provided on the male probe which are angled in the downward direction, the male coupling member is less likely to become fouled by marine sediment falling towards the seafloor. In order to accommodate a male member having such anti-fouling flow ports, bore 14 of the female member may include annular flow channel 30. It will be appreciated, however, that the invention may also be used with coupling members designed for conventional male probes having axial flow ports.

To provide a fluid-tight seal between the probe 71 of male member 2 and the receiving chamber of the female member 1, the female member may comprise a plurality of sealing elements. The illustrated embodiment comprises a seal cartridge which contains a number of seals and acts to retain at least one other seal in the female body. The seal cartridge may comprise a generally cylindrical sleeve 50 which is at least partially inserted into outer shell 54 which as externally-threaded portion 62 for engaging the bore 14 of female body 10. Sleeve 50 and shell 54 may have an interference fit such that withdrawal of shell 54 from body 10 effects removal of the entire seal cartridge. Spanner engagement holes 56 may be provided in shell 54 to allow an appropriate tool to be used to insert and/or remove the seal cartridge.

An O-ring seal 40 (or the like) may be provided in an annular groove in one end of sleeve 50 for sealing against shoulder 34 of axial bore 14. Axial bore 14 may also comprise shoulder 36 for retaining probe seal 38 which, in a preferred embodiment, is a pressure-energized metal J seal. A pressure-energized metal J seal is available from American Seal and Engineering Company, Inc. (Orange, Conn.). Probe seal 38 seals between the outer surface of male probe 71 and female body 10 and may be oriented such that it is pressure energized by hydraulic fluid pressure in annular flow passage 30. Seal 38 may be retained on shoulder 36 by seal cartridge member 50, as shown in FIG. 1.

Embodiments of the invention wherein a female member mates with a male member having a probe with an axial flow port(s) may include a recess in bore 14 for accommodating the "leg" of a pressure-energized J seal 38.

The seal cartridge may also comprise ring retainer 46 having recess 44 for accommodating the "leg" of J seal 42. Ring-shaped retainer 46 may also have an angled shoulder for engaging crown seal 52 which may have a correspondingly angled end to resist radial movement into the receiving chamber under the influence of negative pressure such as may occur during withdrawal of the male probe. Outer shell 54 of the seal cartridge may have angled shoulder 60 to likewise engage crown seal 52.

Crown seal 52 may have integral bore liner section 58 for preventing metal-to-metal contact (with consequent galling) between probe 71 and the receiving chamber of female member 1. In the illustrated embodiment, probe seal 52 is a double crown seal and includes optional circumferential O-ring seals 48 for sealing between crown seal 52 and seal cartridge sleeve 50. In one particular preferred embodiment, crown seal 52 is machined from PEEK polymer which has been found to provide both sealing effectiveness and anti-galling protection in bore liner section 58.

Figure 2:
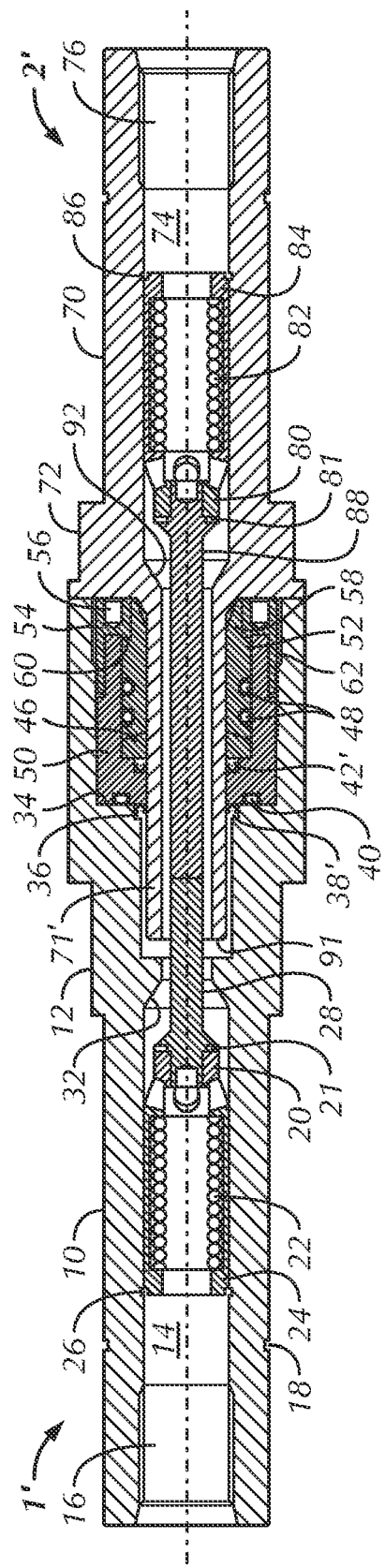
FIG. 2 is a cross-sectional view of a female hydraulic coupling member according to a second embodiment of the invention engaged with a corresponding male hydraulic coupling member.

Seal 42 may be a pressure-energized seal whose sealing effectiveness between the outer surface of male probe 71 and seal cartridge sleeve 50 is increased in response to subsea hydrostatic pressure. Seal 42 may help prevent seawater from entering the hydraulic system in the event that the pressure of hydraulic fluid in flow passage 30 is less than the hydrostatic head. In the embodiment illustrated in FIG. 1, seal 42 is a pressure-energized metal J-seal. In the embodiment shown in FIG. 2, seal 42' is a pressure-energized metal C-seal as is seal 38' and female coupling 1' is mated to male coupling member 2' having male probe 71' with axial flow port 91. In yet other embodiments, seal 42 may have other configurations which are responsive to hydrostatic pressure.

Although the invention has been described in detail with reference to certain preferred embodiments, variations and modifications exist within the scope and spirit of the invention as described and defined in the following claims.

What is claimed is:

1. A female hydraulic coupling member comprising:
a generally cylindrical body having a central, axial bore;
a receiving chamber in the axial bore for receiving the probe of a corresponding male hydraulic coupling member;
a pressure-energized metal seal positioned to seal between the body and the probe of a corresponding male hydraulic coupling member inserted in the receiving chamber and configured such that the sealing force of the pressure-energized metal seal increases with an increase in ambient pressure.

2. A female hydraulic coupling member as recited in claim 1 wherein the pressure-energized metal seal is a C-seal.

3. A female hydraulic coupling member as recited in claim 1 wherein the pressure-energized metal seal is a J-seal.

4. A female hydraulic coupling member as recited in claim 1 wherein the pressure-energized metal seal is an annular axial seal comprising: a first side and an opposite second side; a generally frustro-conical central body having opposite ends; a first end portion contiguous with one of said opposite ends of said generally frustro-conical central body, said first end portion having a first distal end; said central body having a thickness that tapers in the direction of said first distal end; a generally curled second end portion contiguous with the other of said opposite ends of said generally frustro-conical central body, said second end portion extending to a second distal end; said second end portion curling in a first direction in accordance with a predetermined radius such that said second distal end is located across from said first side of said annular axial seal and said first and second distal ends do not face each other and said first and second end portions and said central body being configured to provide said annular axial seal with a "j" shaped cross-section.

5. A female hydraulic coupling member as recited in claim 4 wherein said annular axial seal has a degree of resiliency.

6. A female hydraulic coupling member as recited in claim 1 wherein the pressure-energized metal seal is an annular axial seal consisting of: a linear section consisting of opposite ends, a first side in a first plane and an opposite second side in a second plane, said second plane being parallel to said first plane; a curled section contiguous with one of said ends of said linear section, said curled section curling in a first direction to a distal end, said curled section curling in said first direction In accordance with a predetermined radius and predetermined distance such that said distal end of said curled section is located directly across from said first side of said linear section; said linear section and said curled section providing a "J" shaped cross-section; and a tip portion contiguous with the opposite end of said linear section such that said linear section is between said tip portion and said curled section, said tip portion being slightly curved with respect to said linear section such that said tip portion breaks said first plane, said tip portion having an end that does not directly face said distal end of said curled section.

7. A seal cartridge for a female hydraulic coupling member comprising:
a first inner ring;
a second outer ring concentric with the first inner ring with at least part of the first inner ring fitting radially inside the second outer ring in an engaged position, at least part of the second outer ring having an externally threaded area to engage the female coupling member;
an annular groove in a first end of the first inner ring configured to abut an internal shoulder in the receiving chamber of a female coupling member;
a seal in the annular groove for sealing between the first inner ring and an internal shoulder in the receiving chamber of a female coupling member;
a first shoulder on the interior surface of the first inner ring;
a second shoulder adjacent the first shoulder on the interior surface of the first inner ring;
a third ring configured to fit within the first inner ring and abut the second shoulder at a first end;
a pressure-energized metal seal retained on the first shoulder by the first end of the third ring and configured such that the seal expands in a radial direction in response to ambient pressure; and,
a ring-shaped seal positioned between the third ring and second outer ring.

8. A seal cartridge as recited in claim 7 wherein the second outer ring has an angled shoulder and the third ring has an angled second end opposite the first end and the ring-shaped seal positioned between the third ring and second out ring has a wedge-shaped cross section and a dovetail interfit with the angled shoulder of the second outer ring and the angled second end of the third ring.

9. A seal cartridge as recited in claim 7 further comprising at least one O-ring seal in a circumferential groove on the outer surface of the ring-shaped seal positioned between the third ring and the second outer ring which seals between the ring-shaped seal and the first inner ring.

10. A seal cartridge as recited in claim 7 wherein the ring-shaped seal positioned between the third ring and second outer ring is a crown seal.

11. A seal cartridge as recited in claim 7 wherein the ring-shaped seal positioned between the third ring and second outer ring comprises an integral bore liner which lines the interior surface of the second outer ring.

12. A seal cartridge as recited in claim 7 wherein the pressure-energized metal seal is a J seal.

13. A seal cartridge as recited in claim 12 further comprising a shoulder on the inner surface of the third ring sized and spaced to accommodate the leg of the J seal.

14. A female undersea hydraulic coupling member, comprising:
(a) a generally cylindrical body having an internal bore with a receiving chamber having a first internal shoulder;
(b) a seal retainer insertable into the receiving chamber; the seal retainer having a first inner ring and a second outer ring concentric with the first inner ring; at least part of the first inner ring fitting radially inside the second outer ring in an engaged position; the first inner ring having a first end abutting the internal shoulder in the receiving chamber; at least part of the second outer ring having an externally threaded area to engage the female member;
(c) a soft seal positioned between the first inner ring and second outer ring;

(d) a first pressure-energized metal seal positioned between the first inner ring and the internal shoulder which expands in a radial direction in response to hydraulic pressure within the internal bore;

(e) a second shoulder on the interior surface of the first inner ring;

(f) a third shoulder adjacent the second shoulder on the interior surface of the first inner ring;

(g) a third ring configured to fit within the first inner ring and abut the third shoulder at a first end;

(h) a second pressure-energized metal seal retained on the second shoulder by the first end of the third ring which expands in a radial direction in response to hydrostatic pressure.

15. The undersea hydraulic coupling member of claim 14 wherein the soft seal has a wedge-shaped cross section and a dovetail interfit between the second outer ring and the third ring.

16. The undersea hydraulic coupling member of claim 14 further comprising a valve for controlling fluid flow through the bore.

17. The undersea hydraulic coupling member of claim 14 wherein at least one of the pressure-energized metal seals is a C-seal.

18. The undersea hydraulic coupling member of claim 14 wherein at least one of the pressure-energized metal seals is a J-seal.

* * * * *